United States Patent
Oney

(10) Patent No.: US 10,441,919 B2
(45) Date of Patent: Oct. 15, 2019

(54) DEEP OCEAN DESALINATION SYSTEM AND METHODS OF USING SAME TO PRODUCE POTABLE WATER

(71) Applicant: Stephen K. Oney, Manassas, VA (US)

(72) Inventor: Stephen K. Oney, Manassas, VA (US)

(*) Notice: Subject to any disclaimer, the term of this patent is extended or adjusted under 35 U.S.C. 154(b) by 201 days.

(21) Appl. No.: 14/203,803

(22) Filed: Mar. 11, 2014

(65) Prior Publication Data

US 2014/0263005 A1    Sep. 18, 2014

Related U.S. Application Data

(60) Provisional application No. 61/779,365, filed on Mar. 13, 2013.

(51) Int. Cl.
| | | |
|---|---|---|
| *B01D 61/02* | (2006.01) | |
| *C02F 1/44* | (2006.01) | |
| *C02F 103/08* | (2006.01) | |
| *B01D 61/10* | (2006.01) | |

(52) U.S. Cl.
CPC ........ *B01D 61/025* (2013.01); *B01D 61/10* (2013.01); *C02F 1/441* (2013.01); *B01D 2313/243* (2013.01); *B01D 2313/90* (2013.01); *C02F 2103/08* (2013.01); *C02F 2201/008* (2013.01); *C02F 2201/009* (2013.01); *Y02A 20/131* (2018.01); *Y02A 20/211* (2018.01); *Y02A 20/212* (2018.01)

(58) Field of Classification Search
CPC ............ C02F 2103/08; C02F 2201/009; C02F 2201/008; B01D 61/10; B01D 61/025; B01D 2313/243; B01D 2313/90
See application file for complete search history.

(56) References Cited

U.S. PATENT DOCUMENTS

| | | | |
|---|---|---|---|
| 3,440,146 A | 4/1969 | Louw | 203/11 |
| 3,467,013 A | 9/1969 | Conner | 417/244 |
| 3,468,762 A | 9/1969 | Klitzsch | 202/186 |
| 3,841,254 A | 10/1974 | Dragonas | 114/77 |
| 3,928,145 A | 12/1975 | Othmer | 203/11 |
| 4,036,028 A | 7/1977 | Mandrin | 62/52 |
| 4,078,975 A | 3/1978 | Spears, Jr. | 203/10 |
| 4,172,766 A | 10/1979 | Laing et al. | 202/173 |
| 4,233,153 A | 11/1980 | Hammel et al. | 203/10 |
| 4,293,240 A | 10/1981 | Ogimoto et al. | 405/195 |
| 4,302,297 A | 11/1981 | Humiston | 202/185 R |

(Continued)

FOREIGN PATENT DOCUMENTS

| | | |
|---|---|---|
| DE | 197 34 981 A1 | 6/1998 |
| DE | 102 11 788 A1 | 10/2003 |

(Continued)

OTHER PUBLICATIONS

Morgan, Polyhedral Underwater Structures, May 18, 2969, pp. 1-7.*

(Continued)

*Primary Examiner* — Bobby Ramdhanie
*Assistant Examiner* — Donovan Bui-Huynh
(74) *Attorney, Agent, or Firm* — Bradley Arant Boult Cummings LLP

(57) ABSTRACT

A deep ocean desalination system that uses hydrostatic pressure to reverse osmosis the seawater. The membrane structure is deployed to a predetermined ocean depth and includes a submersible pump system.

5 Claims, 5 Drawing Sheets

(56) References Cited

U.S. PATENT DOCUMENTS

| | | | | |
|---|---|---|---|---|
| 4,311,012 | A | 1/1982 | Finley | 60/641.7 |
| 4,356,785 | A | 11/1982 | Baile | 114/264 |
| 4,452,696 | A | 6/1984 | Lopez | 210/170.11 |
| 4,568,522 | A | 2/1986 | Corbett | 422/186 |
| 4,618,421 | A | 10/1986 | Kantor | 210/170.09 |
| 4,942,700 | A * | 7/1990 | Hoberman | E04B 1/3211 |
| | | | | 52/109 |
| 4,993,348 | A | 2/1991 | Wald | 114/265 |
| 5,197,263 | A | 3/1993 | Midtling et al. | 56/8 |
| 5,229,005 | A | 7/1993 | Fok et al. | 210/652 |
| 5,306,397 | A | 4/1994 | Schmidt | 203/11 |
| 5,582,691 | A | 12/1996 | Flynn et al. | 203/11 |
| 5,840,159 | A | 11/1998 | Rosenblad | 203/10 |
| 5,914,041 | A | 6/1999 | Chancellor | 210/641 |
| 5,970,846 | A | 10/1999 | Roehr | 99/276 |
| 6,158,220 | A | 12/2000 | Hansen et al. | 60/649 |
| 6,223,669 | B1 | 5/2001 | Bowden | 114/65 |
| 6,694,910 | B1 | 2/2004 | Sharapov | 114/264 |
| 7,153,423 | B2 | 12/2006 | Gordon | 210/242.1 |
| 7,306,724 | B2 | 12/2007 | Gordon | 210/241 |
| 7,455,778 | B2 | 11/2008 | Gordon | 210/652 |
| 7,510,658 | B2 | 3/2009 | Gordon | 210/652 |
| 7,658,843 | B2 | 2/2010 | Krock et al. | 210/170.11 |
| 2003/0024803 | A1 | 2/2003 | Max | 203/10 |
| 2004/0065614 | A1 | 4/2004 | Gordon et al. | 210/650 |
| 2004/0084156 | A1* | 5/2004 | Hata | B01D 3/10 |
| | | | | 159/47.1 |
| 2004/0206681 | A1 | 10/2004 | Gordon | 210/259 |
| 2005/0082214 | A1 | 4/2005 | Max | 210/220 |
| 2006/0288950 | A1* | 12/2006 | Cartwright | A01K 61/007 |
| | | | | 119/223 |
| 2007/0039860 | A1* | 2/2007 | Krock | B01D 61/025 |
| | | | | 210/170.01 |
| 2008/0290032 | A1* | 11/2008 | Ton That | B01D 61/025 |
| | | | | 210/651 |
| 2009/0130706 | A1 | 5/2009 | Berzin et al. | 435/41 |
| 2009/0250398 | A1* | 10/2009 | Meller | B01D 61/025 |
| | | | | 210/636 |
| 2009/0298159 | A1 | 12/2009 | Wu et al. | 435/257.3 |
| 2010/0216203 | A1 | 8/2010 | Trent et al. | 435/166 |
| 2011/0204279 | A1 | 8/2011 | Minor et al. | 252/68 |
| 2012/0235415 | A1 | 9/2012 | Madison | 290/54 |
| 2014/0076812 | A1* | 3/2014 | Munro | C02F 1/441 |
| | | | | 210/652 |

FOREIGN PATENT DOCUMENTS

| | | | |
|---|---|---|---|
| EP | 0009387 A1 | 4/1980 | |
| EP | 0802166 A2 * | 10/1997 | C02F 3/1226 |
| EP | 0 968 755 A | 1/2000 | |
| ES | 2 165 824 A1 | 3/2002 | |
| WO | WO 2005/068605 A1 | 7/2005 | |
| WO | WO 2012/102849 A1 | 8/2012 | |

OTHER PUBLICATIONS

Lampe, H., et al., "PCS-Preussag Conversion System Mobile Floating Seawater Desalination Plant", Desalination 114, pp. 145-151, (1997).
U.S. Appl. No. 11/513,602, filed Aug. 2006.
U.S. Appl. No. 11/471,747, filed Jun. 2006.
International Search Report dated Jul. 1, 2014 of corresponding International Patent Application No. PCT/US14/23701.
International Search Report dated Aug. 21, 2014 of related International Patent Application No. PCT/US14/27659.
International Search Report dated Jun. 27, 2014 of related International Patent Application No. PCT/US14/23676.

* cited by examiner

DEEP OCEAN DESALINATION SYSTEM AND METHODS OF USING SAME TO PRODUCE POTABLE WATER

CROSS-REFERENCE TO RELATED APPLICATIONS

This application claims priority to U.S. Provisional Patent Application No. 61/779,365, which was filed on Mar. 13, 2013, the entire disclosure of which is incorporated by reference herein.

FIELD OF THE INVENTION

The present invention is directed to a deep ocean desalination system. In particular, the present invention relates to system a mobile or stationary deep ocean desalination system using hydrostatic pressure to reverse osmosis the seawater and a riser/submersible pump system.

BACKGROUND OF THE INVENTION

The World Health Organization recommends consumption of at least 20 liters of fresh water per day for individual survival. When considering infrastructure and communal needs, such as those of schools and hospitals, the necessary fresh water consumption level for individual survival is approximately 50 liters per person per day. While the consumption rate per individual for a number of African countries is at the WHO consumption recommendation level of 20 liters, in other western countries, the fresh water consumption level reaches only 150 liters per day. In the United States, people consume on average up to 400 liters of freshwater per day. As such, with the rising population, industrialization of developing nations, and overall increase in quality of life throughout most parts of the world, fresh water consumption levels continue to rise. In fact, it is estimated that by the year 2040, demand for fresh water will surpass the available supply.

Compounding this problem is the growing contamination of fresh water sources, which only comprise about 2.5 percent of the total water on earth. Of that 2.5 percent, only 0.5 percent of the total fresh water available is found in easily accessible sources such as lakes, rivers and aquifers. The remainder of the total fresh water sources is in frozen form in glaciers.

Moreover, populated areas struck by natural disasters are faced with a great need to quickly supply potable water to the victims for drinking, cooking, and sanitation purposes. In industrialized nations, the fresh water infrastructure normally relied on is often damaged or contaminated to the point that it cannot be used in the immediate recovery period after the devastation of such an event. In contrast, a fresh water infrastructure might not even exist in developing nations, making the acquisition and distribution of potable water all the more difficult. Thus, while the scarcity of potable water is a growing problem worldwide, it is particularly concerning in arid regions and among developing countries.

According to the United Nations Atlas of the Oceans, more than 44 percent of the world's inhabitants live within 150 kilometers of the coast. This 44 percent accounts for more people than there were in the entire world just 60 years ago. In the United States, 53 percent of the population lives near the coast. In another 30 years, it is estimated that over 70 percent of the population will be coastal. The crowding of the population in any particular area necessarily leads to overexploitation of regional resources, which, in this context, includes fresh water. Given the number of people within proximity of the coast and the sea, it would be beneficial to turn to the sea for fresh water.

However, in contrast to the 1,500 parts per million (ppm) in total dissolved solids (TDS) contained by fresh water, sea water ranges from 10,000-45,000 ppm in TDS, with 35,000 TDS being the standard reference [Cipollina et al., 2009]. The United States Environmental Protection Agency recommends an upper limit of 500 ppm for drinking water.

With such a large amount of non-potable water available (sea water comprises about 97.5 percent of the total water on earth), increased effort has been made in recent years to scale up desalination. However, while methods exist to desalinate water, the current processes require a significant amount of energy. FIG. 1 explores the various types of renewable energy (RE) technologies and the relationship to particular desalination processes. While some RE technologies are in commercial operation today (e.g., solar energy and wind energy are proven sources of RE that can provide electricity to any electrically driven desalination system), others have yet to be demonstrated and those that are in commercial operation are still in need of refinement. For example, tidal and wave energy have very recently begun to show much promise, but are still in early phases of commercialization.

Based on the potential future lack of potable water in overpopulated areas, contaminated water in times of disaster, and locations with no fresh water infrastructure, there is a need in the art for large scale potable water production that minimizes energy consumption. In addition, with the lack of available fresh water sources from which to retrieve potable water, the extremely high coastal populations, and rising energy prices, pairing potable water production from the sea with renewable energy is also needed.

SUMMARY OF THE INVENTION

The present invention relates to a system and method of using a system to desalinate seawater. In one embodiment, the system includes a floating vessel, a pump, a hose, a membrane structure for reverse osmosis, and a riser to carry the fresh water to an intended destination. The system may be deployed for a predetermined length of time to a predetermined depth in the ocean. Alternatively, the system may be permanently deployed to provide a constant source of fresh water to the intended destination.

The present invention relates to a desalination system including: a floating vessel, wherein the floating vessel is capable of deploying a membrane structure including a pump and a hose to a predetermined depth in the ocean, wherein the membrane structure is capable of containing fresh water produced via reverse osmosis, and wherein the predetermined depth is at least about 350 meters; and a riser capable of delivering the fresh water to an intended destination.

In one embodiment, the membrane structure includes a polyhedron shape. The polyhedron shape may be based on the Hoberman Sphere. In another embodiment, the riser is flexible. In still another embodiment, the riser is rigid. In yet another embodiment, the predetermined depth is at least about 400 meters. In still another embodiment, the predetermined depth is between about 350 meters and about 750 meters.

The intended destination may be the floating vessel, the shore, or an offshore-based buoy.

The present invention also relates to a desalination system including: a floating vessel including a hose, wherein the hose extends from the floating vessel to a predetermined depth in the ocean; a membrane structure located at the predetermined depth in the ocean and capable of producing fresh water via reverse osmosis, wherein the membrane structure includes a submersible pump operatively connected to the hose, and wherein the pump maintains a pressure differential required for the reverse osmosis; and a riser capable of delivering the fresh water to an intended destination.

In one embodiment, the membrane structure has a polyhedron shape. In another embodiment, the riser is flexible. In yet another embodiment, the riser is rigid. The predetermined depth may be at least about 400 meters. In still another embodiment, the predetermined depth is between about 350 meters and about 750 meters.

The present invention also relates to a desalination system including: a membrane structure located at a predetermined depth in the ocean and capable of producing fresh water via reverse osmosis, wherein the membrane structure includes a submersible pump operatively connected to a hose, and wherein the pump maintains a pressure differential required for the reverse osmosis; and a riser operatively connected to the hose and a power supply, capable of delivering the fresh water to an intended destination. In one embodiment, the intended destination is shore. In another embodiment, the predetermined depth is between about 350 meters and 750 meters. In still another embodiment, the predetermined depth is at least about 400 meters. The riser may be flexible or rigid. The system may also include at least one buoy attached to the membrane structure.

BRIEF DESCRIPTION OF THE DRAWINGS

Further features and advantages of the present invention from the following detailed description that is provided in connection with the drawing(s) described below.

DETAILED DESCRIPTION OF THE INVENTION

The present invention relates to systems designed for mobile or stationary deep ocean desalination. In addition, the present invention relates to methods of desalinating deep ocean water using the systems of the invention. In particular, the present invention applies the general concept of membrane technology as a basis for fresh water product separation from the resource seawater through a novel and low-energy alternative. In particular, the present invention incorporates hydrostatic pressure to reverse osmosis the ambient seawater at deployed depth through a membrane. In addition, the system of the invention includes a flexible riser/submersible pump system to produce a "well" effect and continuous fresh water production with limited energy requirements.

Figure 1:
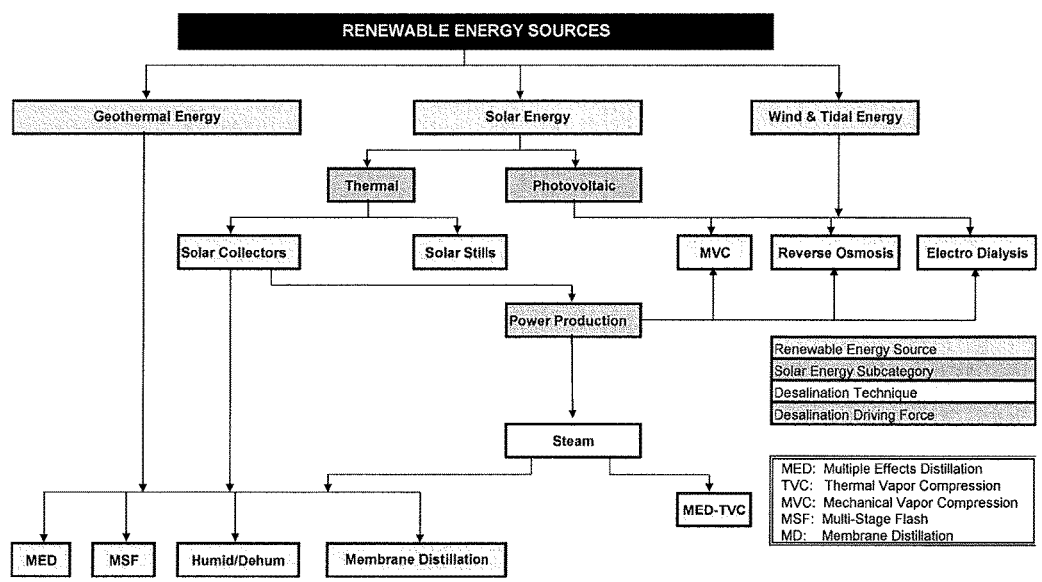
FIG. 1 illustrates the relationships between renewable energy sources and various desalination processes.
Figure 2:
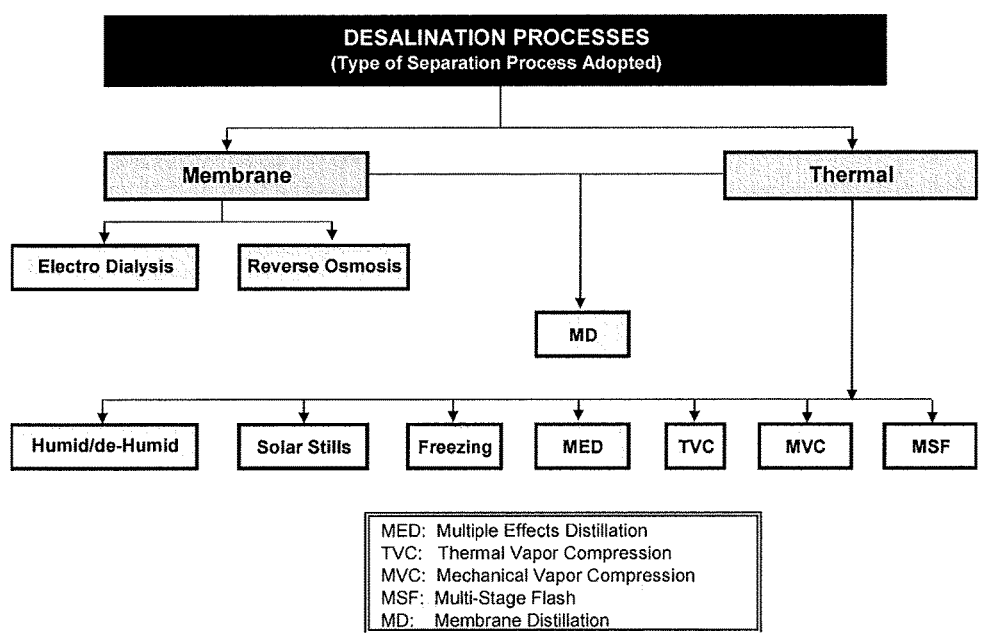
FIG. 2 illustrates the multiple processes associated with desalination processes.

Until recently, the process most often used in desalination operations was a thermal separation process that involves the boiling of water at less than atmospheric pressure (and, accordingly, a lower temperature). However, membrane separation processes are gaining momentum for desalination because of the reduced energy consumption. As shown in FIG. 2, there are two basic types of membrane processes. The first type (electrodialysis and ion exchange desalination) uses ionic exchange membranes to draw the salts out, leaving fresh water behind. Electrodialysis and ion exchange desalination is generally used for brackish water desalination.

The second type (reverse osmosis (RO)) involves semi-permeable membranes that allow the water to pass through without the salt and create two separate streams: a permeate (product water) and a concentrated brine discharge stream. In traditional RO systems, the seawater is pre-treated to remove large debris and suspended solids. Chemicals may also be added during the pre-treatment process to fight bio-fouling within the membrane modules. As such, only after it has been pre-treated is the seawater pumped through the membrane module. This segment of the process requires the bulk of the energy expended. In fact, the pressure differential required to "push" the water across the membrane is generally provided by high-pressure pumps that require significant energy input. The process creates two separate streams, i.e., a permeate (product water) stream and a concentrated brine discharge stream. The concentrated brine discharge stream does not pass through the membrane and is instead traditionally rejected back to the sea. In contrast, the permeate (product water) is collected for consumption. The EPA has determined RO to be the best desalination technology for removing harmful compounds such as arsenic, barium and nitrate from resource waters.

In addition, traditional RO systems use surface ocean water as the resource stream to be desalinated. However, surface ocean water is high in biological activity and requires significant filtering and biofouling measures to create fresh water. As such, the use of the surface ocean water minimizes membrane life and creates unwanted environmental impacts associated with the desalination process. Accordingly, without being bound to any particular theory, it is contemplated that the use of deep ocean water as the resource water, which is beyond the euphotic or biologically active region of the ocean, will reduce or eliminate the biofouling and pre-filtration issues/concerns and allows for significantly (up to 3×) longer life expectancy of the membranes typically associated with traditional desalination technologies. Therefore, operational and maintenance costs are dramatically less than more traditional systems.

Figure 3:
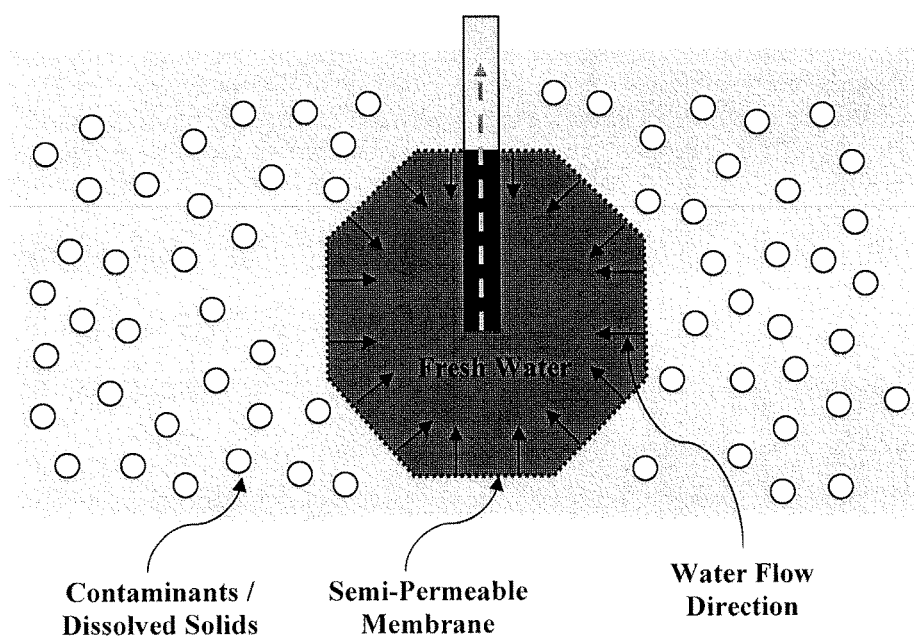
FIG. 3 illustrates a deep ocean reverse osmosis system according to the embodiment of the invention.

The present invention employs a RO process that forces seawater through semi-permeable membranes and restricts any of salts or other dissolved matter from passing through at a predetermined deep ocean depth. As shown generally in FIG. 3, by applying a pressure differential across the membrane, the water is forced to move through the membrane.

Moreover, the present invention relates to a system and method where the only energy required to power the reserve osmosis system is limited to the power required by a pump used to extract the fresh water to the surface from the membrane-enclosed desalination vessel. In one embodiment, the system and method of the invention operates on the premise that the pressure required to drive the sea water through the membrane may be delivered by the natural ocean hydrostatic head created across the membrane container internally exposed to the atmospheric pressure and the external water pressure at the depth of deployment. Thus, without being bound by any particular theory and provided sufficient depth is available for deployment, a submersible pump affixed to a conduit (pipe) encompasses the extent of the energy required to drive the system of the invention and pump the resultant product (fresh) water to the surface. In fact, the internal pressure may be maintained at or near atmospheric pressure thus providing the driving pressure required to draw the fresh water through the membranes while rejecting the dissolved solids and salts. Indeed, the utilization of a submersible pump inside the desalination vessel allows the vessel to essentially operate as a deep ocean "well" that continually creates and replaces fresh water from seawater as the fresh water is pumped to the surface or to shore for consumption.

Figure 4:
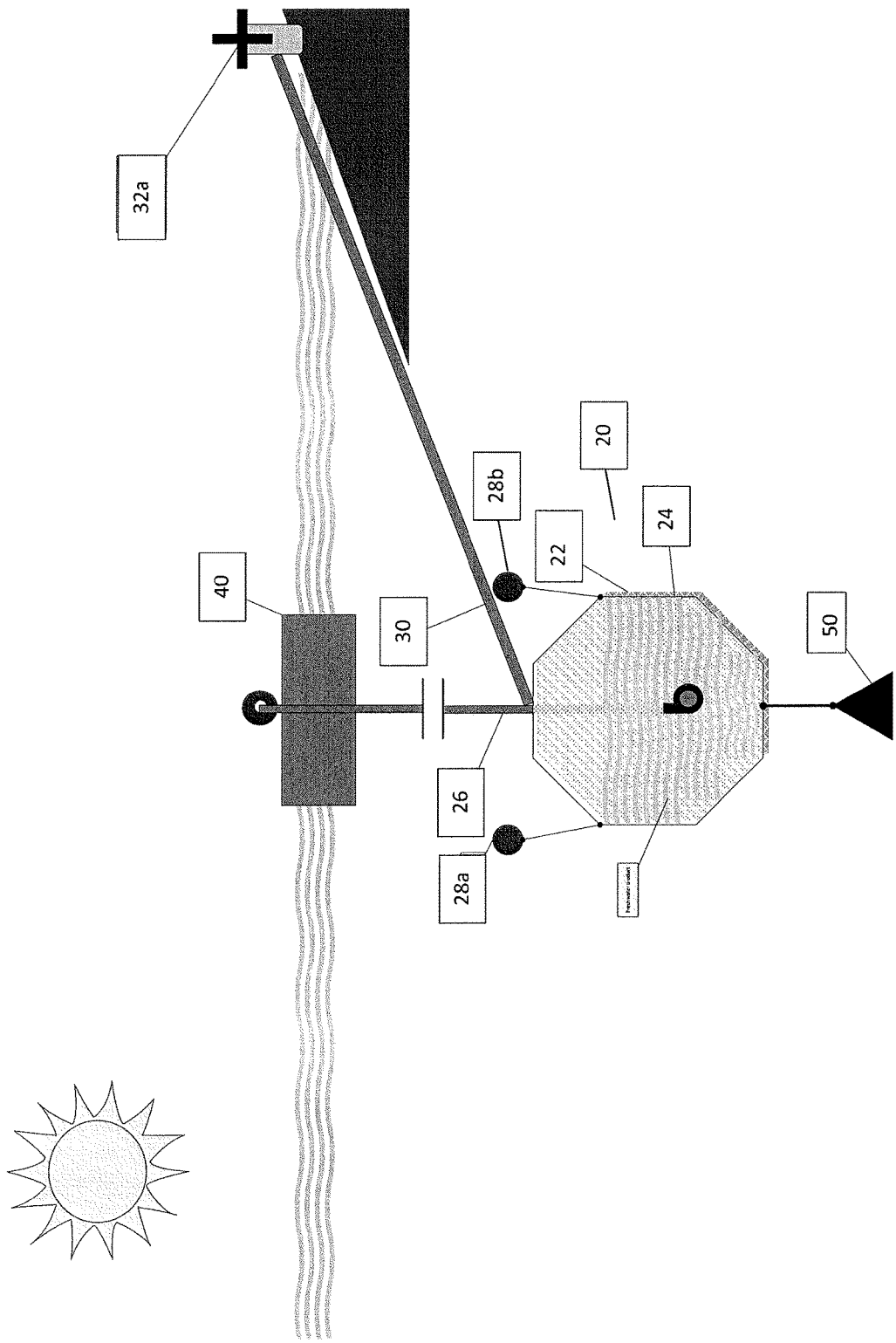
FIG. 4 illustrates a plan view of the system of the invention according to an embodiment of the invention.

In one embodiment, the system includes a membrane structure, a submersible pump, and a riser/pipe connected thereto. For example, as shown in FIG. 4, the membrane structure 20 may include RO membranes 22 that encompass the membrane structure 20. In addition, the submersible pump 24 may be contained within the membrane structure 20 and attached to a riser 26. The riser 26 may be attached to a floating vessel, ship, barge, buoy, or the like (described in more detail below). Alternatively, the riser 26 may be connected to a fresh water delivery pipe 30 (described in more detail below). Buoyancy buoys 28a and 28b may also be employed. The system 10 of the invention may also include a system mooring/anchor system 50.

In another embodiment (also generally shown in FIG. 4), the system may include a floating vessel, ship, barge, buoy, or the like 40 that includes a fixed or deployable/retractable deep water flexible hose 26. For example, the floating vessel may include a winch that is capable of deploying/retracting the hose to a predetermined depth into the ocean. The floating vessel 40 may also include the power source for the submersible pump. The submersible pump 24 may be deployed/retracted with the hose by the winch.

In yet another embodiment, the desalination system (i.e., hose, pump and membrane structure) may be fixed in place and allow for ships/vessels to connect to the deep water "well" and draw fresh water as needed. This option may prove very useful to U.S. Navy applications whereby docking into ports or similar to replenish water resources is deemed dangerous or undesirable. This invention could provide open ocean fresh water "wells" to be developed to service such potable water requirements.

Figure 5:
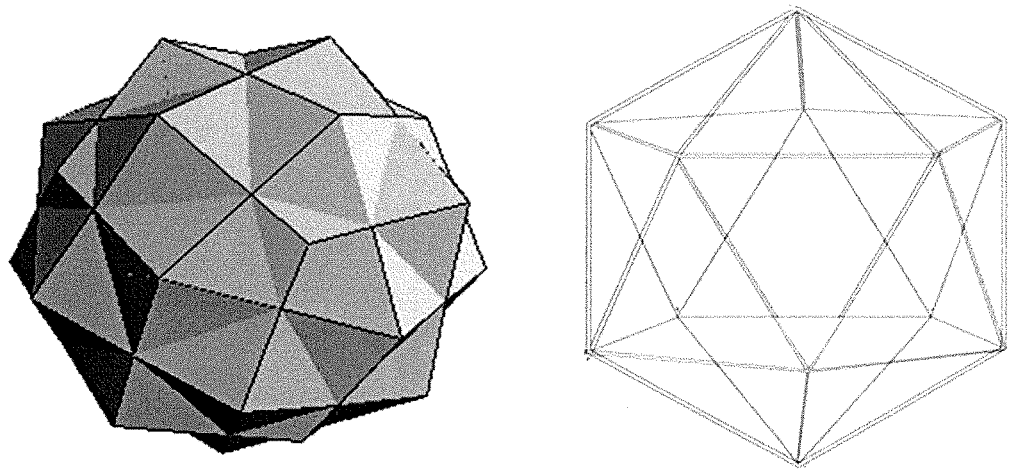
FIG. 5 illustrates a suitable shape for the membrane structure according to an embodiment of the invention.

The membrane structure 20 may be any structure that allows for reverse osmosis according to the present invention and provides the necessary structural integrity to house the RO membranes 22 and maintain the necessary pressure differential across those membranes. In one embodiment, the membrane structure is a polyhedron shape following the Hoberman Sphere concept to maximize surface area and provide optimal structural integrity with minimal materials. In particular, this structure may allow expansion to a larger structure if needed through connection points allowing transport in less bulky configuration until ready for deployment thereby minimizing deck space on the deployment vessel. As shown in FIG. 5, all faces of the polyhedron are the same shape and size. Without being bound to any particular theory, a membrane structure with a polyhedron shape will also allow for improved structural performance of the light-weight system (maximum strength and surface area for structure) and the opportunity for modularization of sizes for membranes (interchangeable membranes across the membrane structure).

In addition to the polyhedron shape, other shapes are also contemplated for the membrane structure. For example, the membrane structure may be in the shape of a sphere, a cylinder, a cube, and the like. In addition, various materials are suitable for use in forming the membrane structure including, but not limited to, concrete, various metals, plastics, fibers, and combinations thereof. In particular, other materials and combinations of materials are suitable for use in forming the membrane structure providing the structure is constructed to handle the forces of the hydrostatic pressure across the permeable membranes that will need to be spread across the internal (or external in some embodiments) structure.

In one aspect, the system of the invention is intended to be stationary. For example, as shown in FIG. 4, the system may include a riser 26 that acts as a conduit for distribution of the fresh water to shore and the means of supplying the energy required to drive the pump. In particular, the system may include a fresh water delivery pipe 30 that is connected to the riser 26 and a shore-based or offshore buoy based system with a renewable energy source 32a.

In one embodiment, the riser may be flexible. The submersible pump 24 may be driven by renewable energy systems, such as coastal wind or solar farms away from load centers, or potentially offshore wave and/or current arrays in the local vicinity of the desalination structure and the water would be a form of energy storage (would produce water when energy was being generated). In this embodiment, if constant production of water is required, the existing power grid could also provide the necessary power and a very consistent and reliable water source would be created with minimal energy requirements.

In another aspect, the system of the invention is mobile. For example, in this configuration, the system would be deployed from a surface vessel, ship, buoy, barge, or the like for the purpose of low cost and low energy water production. One suitable surface vessel is described in U.S. Pat. No. 7,658,843, the entire disclosure of which is incorporated by reference herein. In particular, the harvesting system described in the '843 patent may be modified to deploy and retrieve the proposed system (including the membrane structure) and water production could be performed from ship power during deployment.

In yet another aspect of the invention, the system of the invention is fixed and moored at an appropriate depth with a simple flange connection on the flexible riser that can be connected when a serviceable ship is on station. This concept would have strategic DOD applications in regions of the world whereby the US Navy (or similar) wish to be stationed at sea or need to restock water supplies without risky shore based connections or docking. Ships could pull up to the system of the invention, connect their vessel to the system, pump the necessary water to ship storage (for minimal energy compared to existing ship-based systems), disconnect when completed and depart. This system could be used to service many vessels with just a simple universal flange and power connection.

In one embodiment, the system and method of the invention involves pre-treatment to remove large debris, as well as other substances dissolved in water, such as calcium carbonate. In another embodiment, the system and method of the invention involves a pH adjustment and/or degasification of the product stream before being transferred to the distribution system for use as drinking water. For example, the system and method may include an aeration column in which the pH of the product stream is elevated to a value close to about 7.

Fresh water separation may occur at approximately 35 bars under current membrane technologies. As such, the depth of deployment of the system of the invention under current membrane technology is at least about 350 meters. In one embodiment, the depth of deployment of the system of the invention is at least about 375 meters. In another embodiment, the depth of deployment of the system of the invention is at least about 400 meters. In yet another embodiment, the depth of deployment is between about 350 meters and 750 meters.

It is contemplated that the depth of deployment may be less than about 350 meters depending on the membrane structure. In one embodiment, the depth of deployment is between about 200 meters and about 350 meters. In another embodiment, the depth of deployment is less than about 325 meters. In yet another embodiment, the depth of deployment is less than about 300 meters. As would be understood by those of ordinary skill in the art, the depth of deployment may be adjusted as membrane technologies improve.

Furthermore, the concentrated brine discharge stream may be disposed of by discharge back into the sea at the depth of deployment rather than pumping it up to the surface vessel and then discharging.

The invention described and claimed herein is not to be limited in scope by the specific embodiments herein disclosed, since these embodiments are intended as illustrations of several aspects of this invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The invention claimed is:

1. A desalination system capable of producing fresh water from sea water extracted from a predetermined depth below the ocean surface comprising:
   a reverse osmosis system comprising:
   a membrane-enclosed container having a polyhedron shape following a Hoberman Sphere, wherein all of the faces of the polyhedron shape are the same shape and size and each face of the polyhedron shape is encompassed by a semi-permeable membrane, wherein the membrane-enclosed container has an exterior surface area and an internal cavity; and
   a submersible pump operatively connected to a riser, wherein, once deployed to the predetermined depth, the internal cavity has a first pressure at or near atmospheric pressure and the sea water surrounding the membrane-enclosed container has a second pressure different from the first pressure thus creating a pressure differential that draws fresh water into the internal cavity through each face of the membrane-enclosed container while restricting dissolved solids and salts in the sea water from passing through each face of the membrane-enclosed container, and the pump delivers the fresh water to the riser,
   wherein the riser is operatively connected to a power supply above the ocean surface, wherein the riser deploys the reverse osmosis system to the predetermined depth, wherein the predetermined depth is between about 350 meters and 750 meters, and wherein the pump is operatively connected to the power supply via its operative connection to the riser; and
   a pipe operatively connected to the riser to deliver the fresh water received from the riser to a intended destination;
   at least one buoy attached to the membrane-enclosed container; and
   a mooring system connected to the membrane-enclosed container to maintain the reverse osmosis system at the predetermined depth after deployment.

2. The desalination system of claim 1, wherein the intended destination is shore.

3. The desalination system of claim 1, wherein the predetermined depth is at least about 400 meters.

4. The desalination system of claim 1, wherein the riser is flexible.

5. The desalination system of claim 1, wherein the membrane structure is formed from a material selected from the group consisting of metal, concrete, plastic, fiber, and combinations thereof.

* * * * *